(12) United States Patent
Kato et al.

(10) Patent No.: US 11,306,675 B2
(45) Date of Patent: Apr. 19, 2022

(54) INJECTION CONTROL DEVICE

(71) Applicant: DENSO CORPORATION, Kariya (JP)

(72) Inventors: Yuki Kato, Kariya (JP); Yohei Suganuma, Kariya (JP); Hiroyuki Fukuda, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/357,276

(22) Filed: Jun. 24, 2021

(65) Prior Publication Data
US 2021/0404405 A1   Dec. 30, 2021

(30) Foreign Application Priority Data
Jun. 29, 2020 (JP) .............................. JP2020-111594

(51) Int. Cl.
| B60T 7/12 | (2006.01) |
| F02D 41/20 | (2006.01) |
| F02D 41/40 | (2006.01) |

(52) U.S. Cl.
CPC ........... *F02D 41/20* (2013.01); *F02D 41/402* (2013.01); *F02D 2200/50* (2013.01)

(58) Field of Classification Search
CPC .. F02D 19/023; F02D 19/024; F02D 19/0607; F02D 19/061; F02D 31/007; F02D 35/0046
USPC ......................................... 701/101, 104, 105
See application file for complete search history.

(56) References Cited

U.S. PATENT DOCUMENTS

| 2016/0245202 A1* | 8/2016 | Fukuda | ................... F02D 41/26 |
| 2020/0284214 A1* | 9/2020 | Inaba | ..................... F02D 41/40 |
| 2021/0372338 A1* | 12/2021 | Suganuma | .............. F02D 41/20 |

FOREIGN PATENT DOCUMENTS

JP   2016-033343 A   3/2016

* cited by examiner

Primary Examiner — John Kwon
(74) Attorney, Agent, or Firm — Posz Law Group, PLC

(57) ABSTRACT

In a current-driving of a fuel injection valve to inject fuel through a single injection or a multi-stage injection, an energization time correction amount is calculated by performing area correction on a current flowing through the fuel injection valve. The single injection is switched to the multi-stage injection when the single injection is consecutively performed under a predetermined condition.

8 Claims, 14 Drawing Sheets

INJECTION CONTROL DEVICE

CROSS REFERENCE TO RELATED APPLICATION

The present application claims the benefit of priority from Japanese Patent Application No. 2020-111594 filed on Jun. 29, 2020. The entire disclosure of the above application is incorporated herein by reference.

TECHNICAL FIELD

The present invention relates to an injection control device that controls opening and closing of a fuel injection valve.

BACKGROUND

An injection control device is used to inject fuel into an internal combustion engine by opening and closing a fuel injection valve. In recent years, due to tightening of regulations for environmental problems, further improvement in the fuel injection accuracy in automobiles has been required as measures to improve fuel efficiency and reduce the amount of harmful substance emission. The injection control device opens the fuel injection valve that is electrically drivable by passing current to the fuel injection valve. In recent years, a nominal current profile (also referred to as an ideal current profile) for energization current based on a command injection quantity has been set, and the injection control device opens the fuel injection valve by applying current to the fuel injection valve on the basis of the nominal current profile.

SUMMARY

According to an example embodiment, in a current-driving of a fuel injection valve to inject fuel through a single injection or a multi-stage injection, an energization time correction amount is calculated by performing area correction on a current flowing through the fuel injection valve. The single injection is switched to the multi-stage injection when the single injection is consecutively performed under a predetermined condition.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

If the gradient of the energization current of the fuel injection valve becomes lower than the gradient of the ideal current profile due to various factors such as a peripheral temperature environment and aged deterioration, an actual injection quantity may be largely reduced from the command injection quantity, which may result in deterioration of an A/F value and accidental fire. In order to prevent such problems, it is desirable to previously adjust an energization command time for energization to the fuel injection valve to a rather long time factoring in variations. However, if the rather long energization command time is ensured, the fuel efficiency may be reduced.

In view of this, the applicant of the present application proposes a so-called area correction technique that corrects the energization time on the basis of an integrated current difference between an integrated current of the ideal current profile serving as a target current to reach a target peak current and an integrated current of detected current.

The inventors take into consideration a method for periodically checking whether the area correction technique normally operates on the basis of this technique development process. However, under a specific operation environment, for example, in a low load traveling state, setting of performing injection once, that is, setting of single injection increases. If this situation continues for a long period of time, the number of checks per unit time is reduced, and a high monitor rate, namely, a high detection rate thus cannot be ensured.

In view of the above points, an injection control device is provided for ensuring a high monitor rate.

According to an aspect of the present embodiments, an area correction unit calculates an energization time correction amount by performing area correction on a current flowing through a fuel injection valve in current-driving the fuel injection valve to cause the fuel injection valve to inject fuel. A multi-stage injection switch unit makes a switch from single injection to multi-stage injection when the single injection is consecutively performed under a predetermined condition. When the switch to the multi-stage injection is made, it is possible to increase the possibility that the area correction is executed and increase the number of checks per unit time. Consequently, a high monitor rate can be ensured.

Hereinbelow, some embodiments of an injection control device will be described with reference to the drawings. Identical reference signs or identical step numbers designate identical parts throughout a plurality of embodiments described below to omit redundant description.

First Embodiment

Figure 1:
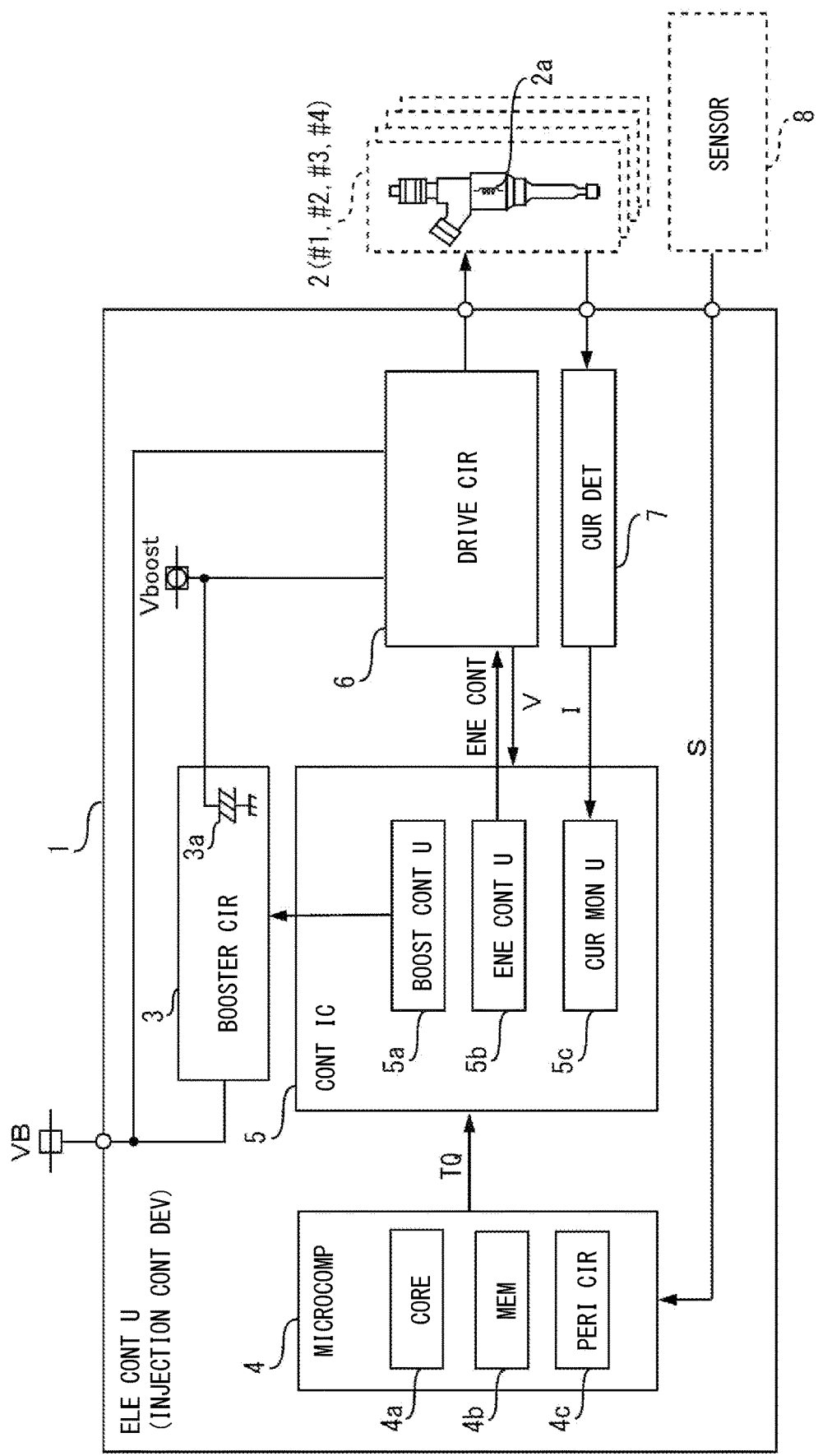
FIG. 1 is the electrical configuration diagram of an injection control device in a first embodiment.

FIGS. 1 to 10 illustrate a first embodiment. As illustrated in FIG. 1, an electronic control unit (ECU) 1 is configured as, for example, an injection control device which drives a solenoid fuel injection valve 2 (also called an injector). The fuel injection valve 2 directly injects fuel into an internal combustion engine mounted on a vehicle such as an automobile. Hereinbelow, a mode in which the present invention is applied to the electronic control unit 1 for gasoline engine control will be described. However, the present invention may also be applied to an electronic control unit for diesel engine control. FIG. 1 illustrates the fuel injection valves 2 for four cylinders. However, the present invention can also be applied to three cylinders, six cylinders, or eight cylinders.

As illustrated in FIG. 1, the electronic control unit 1 has an electrical configuration including a booster circuit 3, a microcomputer 4, a control IC 5, a drive circuit 6, and a current detector 7. The microcomputer 4 includes one or more cores 4a, a memory 4b such as a ROM and a RAM, and a peripheral circuit 4c such as an A/D converter, and performs various control operations in accordance with a program stored in the memory 4b and sensor signals S acquired from various sensors 8.

Although not illustrated, the sensors 8 for a gasoline engine include, for example, a crank angle sensor which outputs a pulse signal every time a crank shaft rotates by a predetermined angle, a water temperature sensor which detects the temperature of an engine cooling water, a fuel pressure sensor which detects the pressure of fuel injected into the engine, an intake amount sensor which detects the amount of intake air, an A/F sensor which detects an air-fuel ratio, that is, an A/F value of exhaust gas of the internal combustion engine, and a throttle opening sensor which detects a throttle opening.

The microcomputer 4 calculates an engine speed from the pulse signal of the crank angle sensor and acquires the throttle opening from a throttle opening signal. The microcomputer 4 calculates a target torque required for the internal combustion engine on the basis of the throttle opening, a hydraulic pressure, and the A/F value, and calculates a required injection quantity serving as a target on the basis of the target torque.

The microcomputer 4 calculates an energization command time Ti of an instruction TQ on the basis of the required injection quantity serving as a target and the fuel pressure detected by the fuel pressure sensor. The microcomputer 4 calculates injection start instruction time t0 for each of cylinders #1 to #4 on the basis of the sensor signals S input thereto from the various sensors 8 described above and outputs the instruction TQ for fuel injection to the control IC 5 at the injection start instruction time t0.

The control IC 5 is an integrated circuit device such as an ASIC and includes, for example, a logic circuit, a control main body such as a CPU, a storage unit such as a RAM, a ROM, or an EEPROM, and a comparator (all of which are not illustrated). The control IC 5 is configured to execute various control operations using hardware and software. The control IC 5 has functions of a boost control unit 5a, an energization control unit 5b, and a current monitoring unit 5c.

Figure 2:
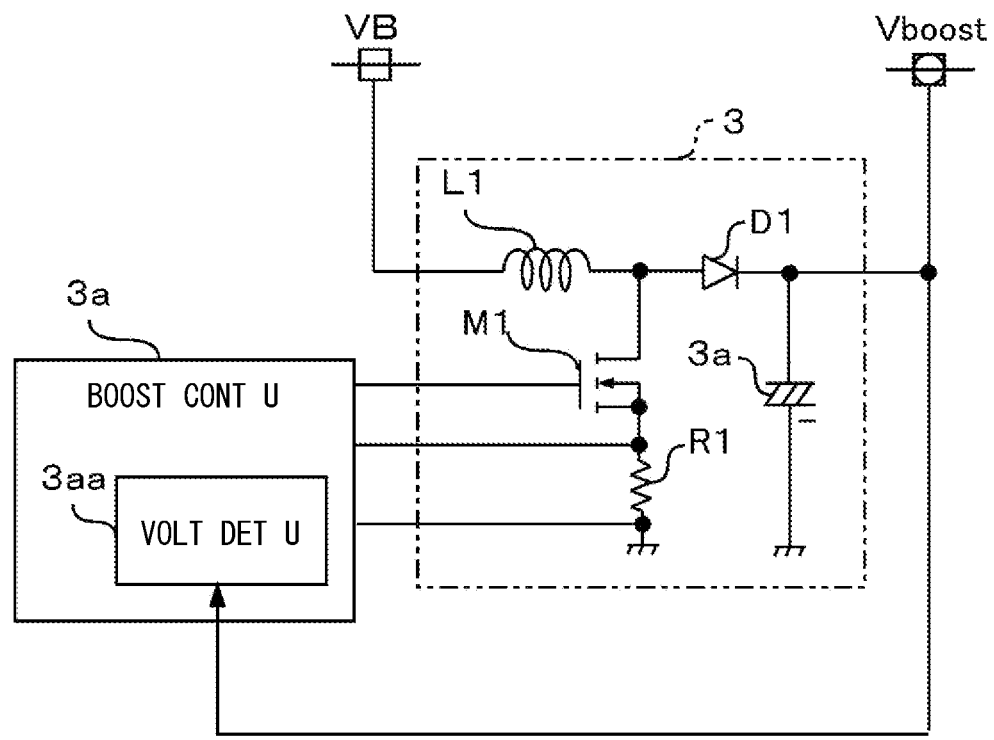
FIG. 2 is the electrical configuration diagram of a booster circuit.

As illustrated in FIG. 2, the booster circuit 3 includes a boost DC-DC converter including an inductor L1, a switching element M1, a diode D1, a current detection resistor R1, and a charging capacitor 3a serving as a charging unit which are connected to each other as illustrated in FIG. 2. The booster circuit 3 receives battery voltage VB input thereto, boosts the battery voltage VB, and charges the charging capacitor 3a with a boost voltage Vboost. The charging capacitor 3a holds power to be supplied to the fuel injection valves 2 which directly inject fuel into the respective cylinders #1 to #4.

The boost control unit 5a boost-controls the battery voltage VB input to the booster circuit 3 by applying a boost control pulse to the switching element M1. The boost control unit 5a detects the boost voltage Vboost in the charging capacitor 3a of the booster circuit 3 using a voltage detection unit 3aa, charges the charging capacitor 3a with the boost voltage Vboost up to a full charge voltage, and supplies the boost voltage Vboost to the drive circuit 6.

The battery voltage VB and the boost voltage Vboost are input to the drive circuit 6. Although not illustrated, the drive circuit 6 includes, for example, a transistor for applying the boost voltage Vboost to the solenoid coils 2a of the fuel injection valves 2 of the cylinders #1 to #4, a transistor for applying the battery voltage VB to the solenoid coils 2a, and a cylinder selection transistor which selects the cylinder to be energized.

The drive circuit 6 selects any of the cylinders #1 to #4 and selectively applies the boost voltage Vboost or the battery voltage VB to the solenoid coil 2a of the fuel injection valve 2 of the selected cylinder in accordance with energization control of the energization control unit 5b of the control IC 5, thereby driving the fuel injection valve 2 to cause the fuel injection valve 2 to inject fuel. When the energization control unit 5b causes the fuel injection valve 2 to perform partial-lift injection through the drive circuit 6, the energization control unit 5b executes an injection process of applying the boost voltage Vboost to the solenoid coil 2a of the fuel injection valve 2 and closing the fuel injection valve 2 before the valve is completely opened. When the fuel injection valve 2 performs normal injection, the energization control unit 5b applies the boost voltage Vboost to the solenoid coil 2a of the fuel injection valve 2 through the drive circuit 6 and then applies the battery voltage VB thereto to perform constant current control, and stops the energization after the elapse of the energization command time Ti. Accordingly, at the normal injection, an injection process of closing the fuel injection valve 2 after the valve is completely opened is executed.

The current detector 7 includes a current detection resistor connected to an energization path of the solenoid coil 2a of the fuel injection valve 2 of each of the cylinders #1 to #4. The current monitoring unit 5c of the control IC 5 includes, for example, a comparator and an A/D converter (both of which are not illustrated), and monitors a current flowing through the solenoid coil 2a of the fuel injection valve 2 through the current detector 7.

Figure 3:
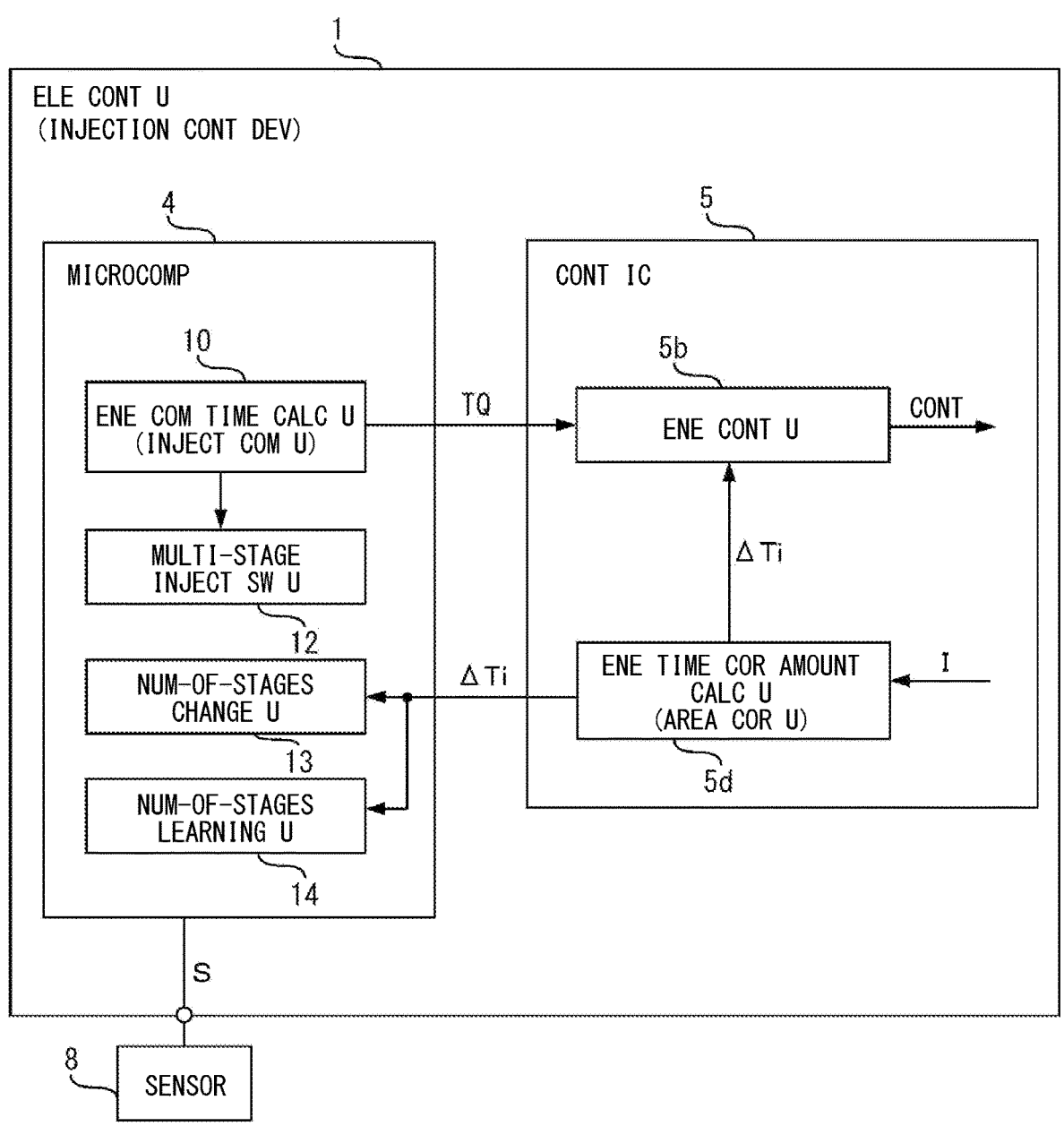
FIG. 3 is a functional configuration diagram of a microcomputer and a control IC.

FIG. 3 schematically illustrates the functional configuration of the microcomputer 4 and the control IC 5. The microcomputer 4 operates as an energization command time calculation unit 10 serving as the injection command unit, a multi-stage injection switch unit 12, a number-of-stages change unit 13, and a number-of-stages learning unit 14 by the core 4a executing a program stored in the memory 4b. The control IC 5 also has a function of an energization time correction amount calculation unit 5d serving as the area correction unit in addition to the functions of the boost control unit 5a, the energization control unit 5b, and the current monitoring unit 5c described above.

The multi-stage injection switch unit 12 is a function of executing a process for making a switch from single injection to multi-stage injection when the single injection is consecutively performed under a predetermined condition. The predetermined condition may be that the single injection is consecutively performed for a predetermined time, the single injection is consecutively performed a predetermined number of times, or another condition.

The number-of-stages change unit 13 is a function of increasing or changing the number of stages of the multi-stage injection so that the energization time correction amount calculation unit 5d performs area correction on the basis of input information. The number-of-stages learning unit 14 is a function of learning the number of stages of the multi-stage injection so that the energization time correction amount calculation unit 5d performs area correction on the basis of input information.

The energization command time calculation unit 10 calculates, at the start of injection control, the required injection quantity on the basis of the sensor signals S of the various sensors 8 and calculates the energization command time Ti of the instruction TQ. The energization command time Ti of the instruction TQ indicates a time for which an instruction to apply voltage to the fuel injection valve 2 is provided in injection control. The energization command time calculation unit 10 issues a single injection command or a multi-stage injection command by outputting the instruction TQ to the energization control unit 5b of the control IC 5.

When the instruction TQ is input to the energization control unit 5b of the control IC 5, the energization control unit 5b performs control to apply the boost voltage Vboost to the fuel injection valve 2 from the drive circuit 6, thereby causing the fuel injection valve 2 to perform single injection or multi-stage injection. On the other hand, when the energization control unit 5b current-drives the fuel injection valve 2 to cause the fuel injection valve 2 to inject fuel, the energization time correction amount calculation unit 5d of the control IC 5 acquires a current flowing through the fuel injection valve 2 and performs area correction on the current, thereby acquiring an energization time correction amount ΔTi.

The energization time correction amount calculation unit 5d feeds back the acquired energization time correction amount ΔTi to the energization control unit 5b at each injection. The energization control unit 5b reflects, in real time, the energization time correction amount ΔTi in the energization command time Ti of each input instruction TQ for single injection or multi-stage injection to control energization of the solenoid coil 2a of the fuel injection valve 2.

<Outline of Area Correction Control Performed by Control IC 5>

First, details of the area correction control performed by the control IC 5 will be schematically described. When the battery voltage VB is applied to the electronic control unit 1, the microcomputer 4 and the control IC 5 are activated. The boost control unit 5a of the control IC 5 boosts the voltage of the charging capacitor 3a of the booster circuit 3 by outputting the boost control pulse to the booster circuit 3. The charging capacitor 3a is charged with the boost voltage Vboost up to a predetermined boost completion voltage Vfull exceeding the battery voltage VB.

Typically, the energization command time calculation unit 10 of the microcomputer 4 calculates the required injection quantity and calculates the instruction TQ at the injection start instruction time t0, and outputs the instruction TQ to the energization control unit 5b of the control IC 5. That is, the microcomputer 4 outputs the energization command time Ti to the control IC 5 through the instruction TQ.

The control IC 5 stores, in an internal memory, the nominal current profile PI serving as a target current for the energization current EI and continues peak current control so that the energization current EI reaches a peak current Ipk serving as a target by applying the boost voltage Vboost to the solenoid coil 2a on the basis of the nominal current profile PI under control of the energization control unit 5b.

Figure 4:
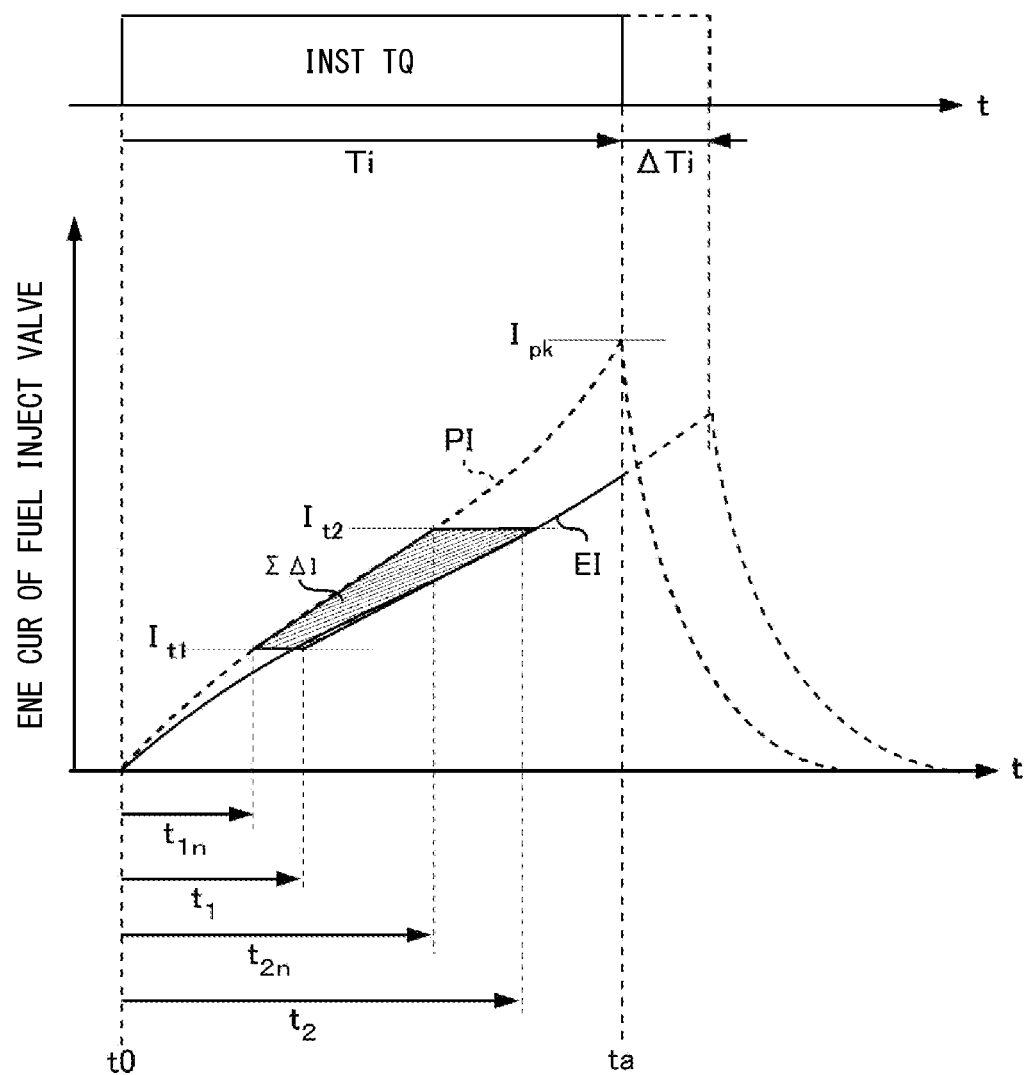
FIG. 4 is an explanatory diagram illustrating a method for calculating an integrated current difference.

The control IC 5 continuously applies the boost voltage Vboost to between terminals of the solenoid coil 2a of the fuel injection valve 2 until the energization current EI reaches the peak current Ipk indicated by the nominal current profile PI on the basis of the energization command time Ti of the instruction TQ. The energization current EI of the fuel injection valve 2 rapidly increases to open the fuel injection valve 2. As illustrated in FIG. 4, the energization current EI of the fuel injection valve 2 nonlinearly varies on the basis of the structure of the fuel injection valve 2.

The gradient of the energization current EI becomes lower than the gradient of the nominal current profile PI due to various factors such as a peripheral temperature environment and aged deterioration, and the actual injection quantity becomes smaller than the normal injection quantity based on the nominal current profile PI.

Thus, in particular, under the condition that the boost voltage Vboost becomes lower than a predetermined voltage Vsta, the control IC 5 calculates the energization time correction amount ΔTi by executing the area correction control and feeds back the calculated energization time correction amount ΔTi to the energization control unit 5b in real time.

The control IC 5 calculates an integrated current difference between the nominal current profile PI and the energization current EI of the fuel injection valve 2 using the energization time correction amount calculation unit 5d. The integrated current difference corresponds to an area surrounded by nonlinear current curves. Thus, in order to calculate the integrated current difference in detail, an operation load tends to increase. Thus, as illustrated in FIG. 4 and represented by Equation (1), the area of a trapezoid with vertices (t, I)=$(t_{1n}, I_{t1})$, $(t_1, I_{t1})$ $(t_{2n}, I_{t2})$, $(t_2, I_{t2})$ may be regarded as the integrated current difference $\Sigma \Delta I$ dependent on the area surrounded by the nonlinear current curves for simple calculation.

[Equation 1]

$$\Sigma \Delta I = \{(t_1 - t_{1n}) + (t_2 - t_{2n})\} \times (I_{t2} - I_{t1}) \div 2 \qquad (1)$$

The energization time correction amount calculation unit 5d calculates the integrated current difference $\Sigma \Delta I$ between the nominal current profile PI from ideal arrival time $t_{1n}$ to reach a current threshold $I_{t1}$ to ideal arrival time $t_{2n}$ to reach a current threshold $I_{t2}$ and the energization current EI of the fuel injection valve 2 from arrival time $t_1$ to actually reach the current threshold $I_{t1}$ to arrival time $t_2$ to actually reach the current threshold $I_{t2}$. This enables the energization time correction amount calculation unit 5d to simply calculate the integrated current difference $\Sigma \Delta I$ by detecting the arrival time $t_1$ to reach the current threshold $I_{t1}$ and the arrival time $t_2$ to reach the current threshold $I_{t2}$.

The energization time correction amount calculation unit 5d calculates an energy shortage Ei by multiplying the integrated current difference $\Sigma \Delta I$ by a correction coefficient α input thereto from the energization command time calculation unit 10 as represented by Equation (2).

[Equation 2]

$$Ei = \Sigma \Delta I \times \alpha = \{(t_1 - t_{1n}) + (t_2 - t_{2n})\} \times (I_{t2} - I_{t1}) \div 2 \times \alpha \qquad (2)$$

Figure 5:
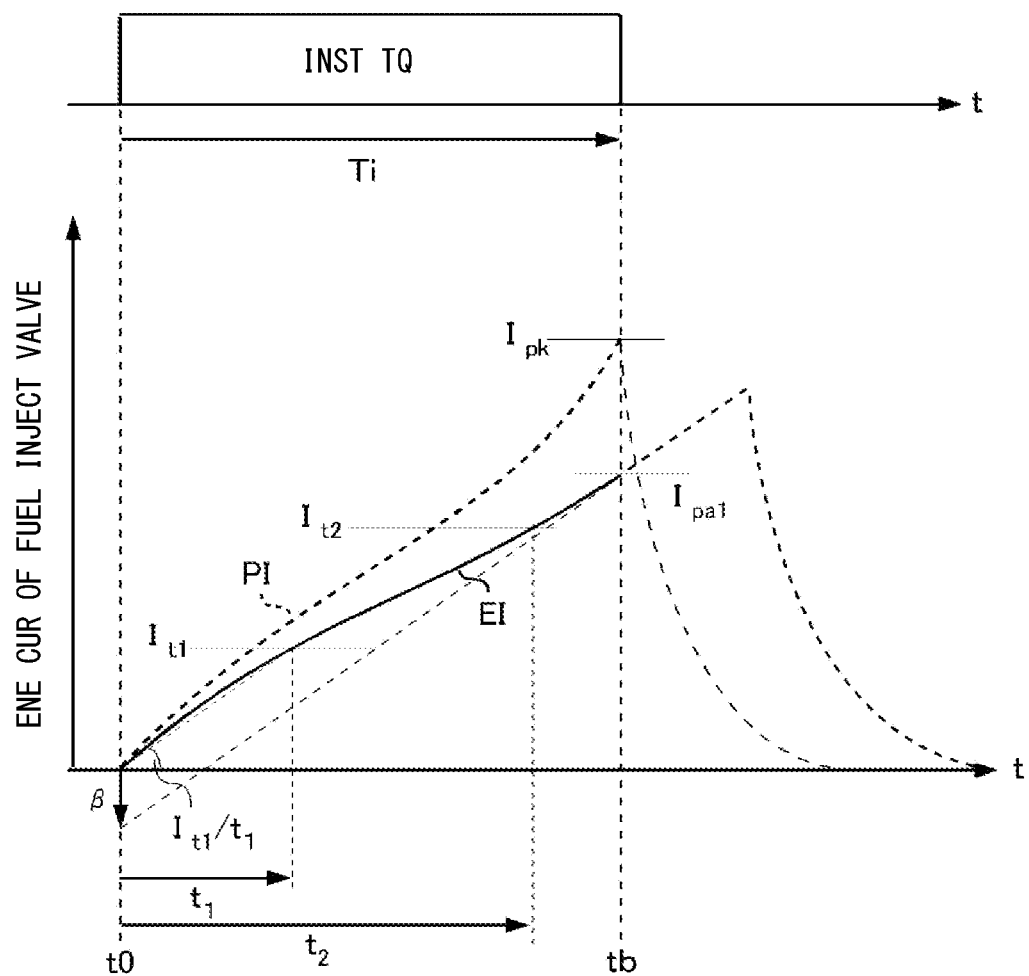
FIG. 5 is an explanatory diagram illustrating a method for calculating a peak current estimation value.

In Equation (2), the correction coefficient α is used to estimate, from the area of the trapezoid, the energy shortage Ei dependent on an actual integrated current difference and previously calculated according to, for example, the load characteristic of the fuel injection valve 2. As illustrated in FIG. 5, the energization time correction amount calculation unit 5d calculates a peak current estimation value $I_{pa1}$ at a point in time when the energization command time Ti indicated by the instruction TQ elapses by calculating a current gradient from the injection start instruction time $t_0$ to the arrival time $t_1$ to reach the current threshold $I_{t1}$ and adding a correction coefficient β thereto as an intercept. At this time, the peak current estimation value $I_{pa1}$ may be calculated using Equation (3).

[Equation 3]

$$I_{pa1} = \frac{I_{t1}}{t_1} \times Ti + \beta \quad (3)$$

The correction coefficient β indicates an offset term for accurately estimating the peak current estimation value $I_{pa1}$ at application OFF timing and is previously calculated according to, for example, the load characteristic of the fuel injection valve 2. Although the current gradient from the injection start instruction time $t_0$ to the arrival time $t_1$ to reach the current threshold $I_{t1}$ is used in the first term of Equation (3), a current gradient from the injection start instruction time $t_0$ to the arrival time $t_2$ to reach the current threshold $I_{t2}$ may be used in the first term of Equation (3).

Next, the energization time correction amount calculation unit 5d calculates the energization time correction amount ΔTi for compensating for the energy shortage Ei. Specifically, as represented by Equation (4), the energization time correction amount calculation unit 5d calculates the energization time correction amount ΔTi by dividing the calculated energy shortage Ei by the estimated peak current estimation value $I_{pa1}$.

[Equation 4]

$$\Delta Ti = Ei \div I_{pa1} \quad (9)$$

$$= \frac{\{(t_1 - t_{1n}) + (t_2 - t_{2n})\} \times (I_2 - I_1) \div 2 \times \alpha}{\frac{I_{t1}}{t_1} \times Ti + \beta}$$

$$= \frac{\{(t_1 - t_{1n}) + (t_2 - t_{2n})\} \times (I_2 - I_1) \times \alpha 2 \times t_1}{\{I_{t1} \times Ti\} + \beta \times t_1}$$

In Equation (4), α2 indicates α/2. It is possible to simply calculate an extension time for compensating for the energy shortage Ei and dramatically reduce an operation amount by deriving the energization time correction amount ΔTi using Equation (4) dependent on the energy shortage Ei and the peak current estimation value $I_{pa1}$.

When the energization time correction amount calculation unit 5d outputs the calculated energization time correction amount ΔTi to the energization control unit 5b, the energization control unit 5b corrects the energization command time Ti to an energization command calculated value of the instruction TQ+the energization time correction amount ΔTi as an effective energization command time by timing tb when a current I detected by the current monitoring unit 5c reaches the peak current estimation value Ipa1. This makes it possible to simply correct the energization command time Ti of the instruction TQ and extend the actual energization time. Such a method eliminates the necessity of previously adjusting the energization command time Ti factoring in variations to prevent accidental fire and makes it possible to take measures against accidental fire while minimizing reduction in the fuel efficiency.

The energization time correction amount calculation unit 5d calculates the energization time correction amount ΔTi in a period from when the current I reaches the last current threshold $I_{t2}$ to when the current I reaches the peak current estimation value $I_{pa1}$. Thus, the energization command time Ti can be corrected with sufficient time. Although a mode in which the energization time correction amount ΔTi is calculated using Equations (1) to (4) has been described, these equations merely show an example, and the present invention is not limited to this method.

Figure 6:
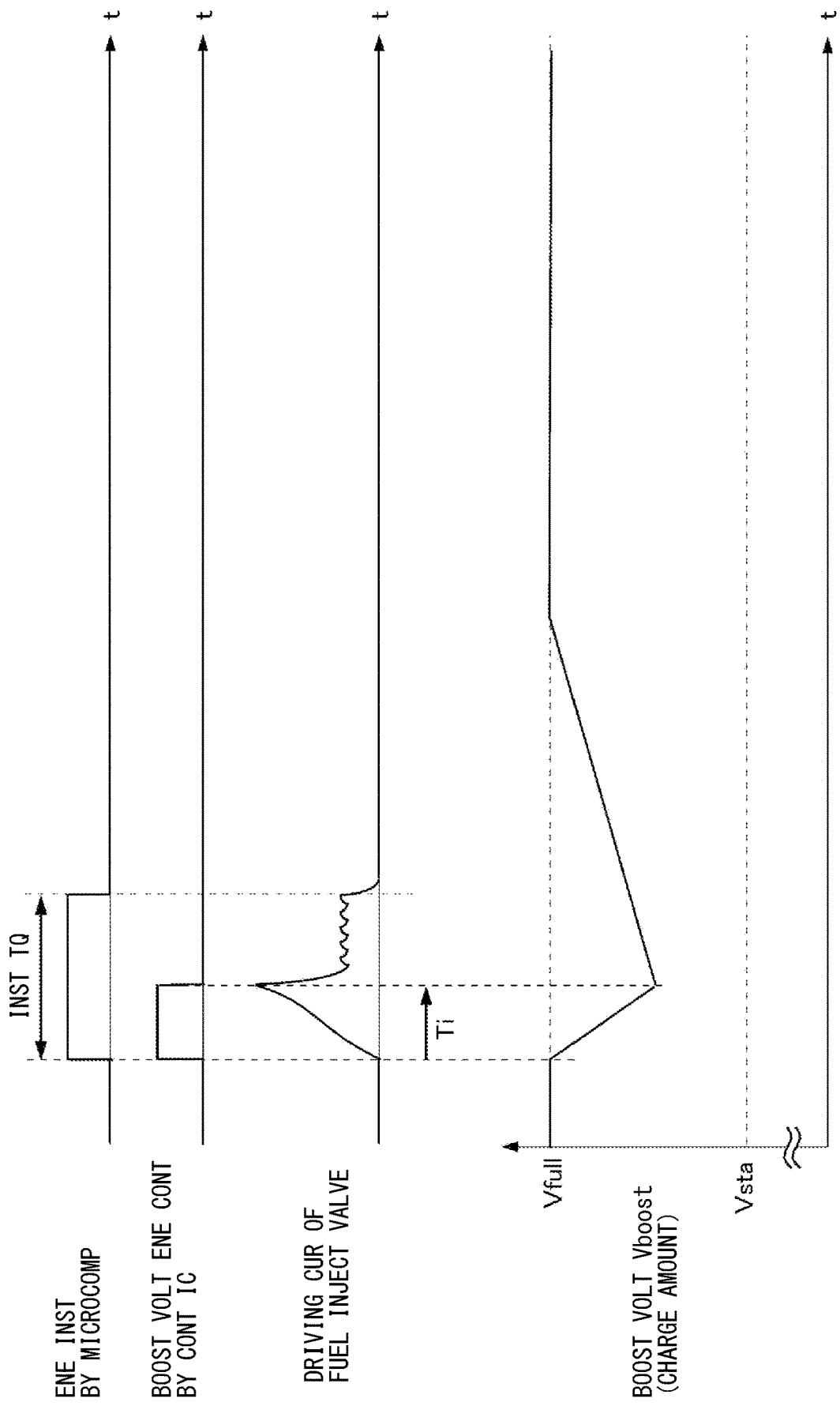
FIG. 6 is a timing chart schematically illustrating variations in a driving current waveform and a boost voltage of a fuel injection valve at single injection.

Hereinbelow, processing details of the microcomputer 4 which executes main control using the control IC 5 as described above will be described. Under a specific operation environment, for example, in a low load traveling state as illustrated in FIG. 6, setting of performing injection once, that is, setting of single injection increases. As described above, the control IC 5 does not perform the area correction control which calculates the energization time correction amount ΔTi unless the boost voltage Vboost becomes lower than the predetermined voltage Vsta. Thus, if this situation continues for a long period of time, the number of area correction checks per unit time is reduced, and a high monitor rate, namely, a high detection rate thus cannot be ensured. In order to ensure a high monitor rate, the microcomputer 4 executes a process illustrated in FIG. 7 regularly, for example, at every predetermined number of injections or every predetermined time.

Figure 7:
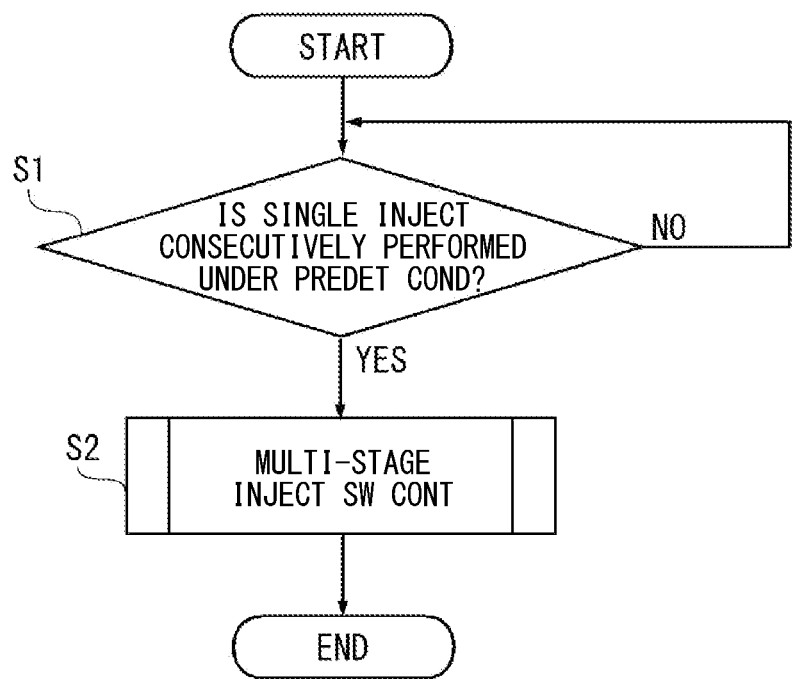
FIG. 7 is a first flowchart schematically illustrating the flow of multi-stage injection switching control.

As illustrated in FIG. 7, in S1, the microcomputer 4 determines whether the single injection is consecutively performed under a predetermined condition in the middle of normal control. When the predetermined condition is met, the microcomputer 4 determines YES in S1 and shifts to multi-stage injection switching control in S2. In S2, the microcomputer 4 makes a switch from the single injection to the multi-stage injection using the multi-stage injection switch unit 12 on the condition that the single injection is consecutively performed for a predetermined time. Alternatively, the microcomputer 4 may make a change from the single injection to the multi-stage injection on the condition that the single injection is consecutively performed a predetermined number of times.

Figure 8:
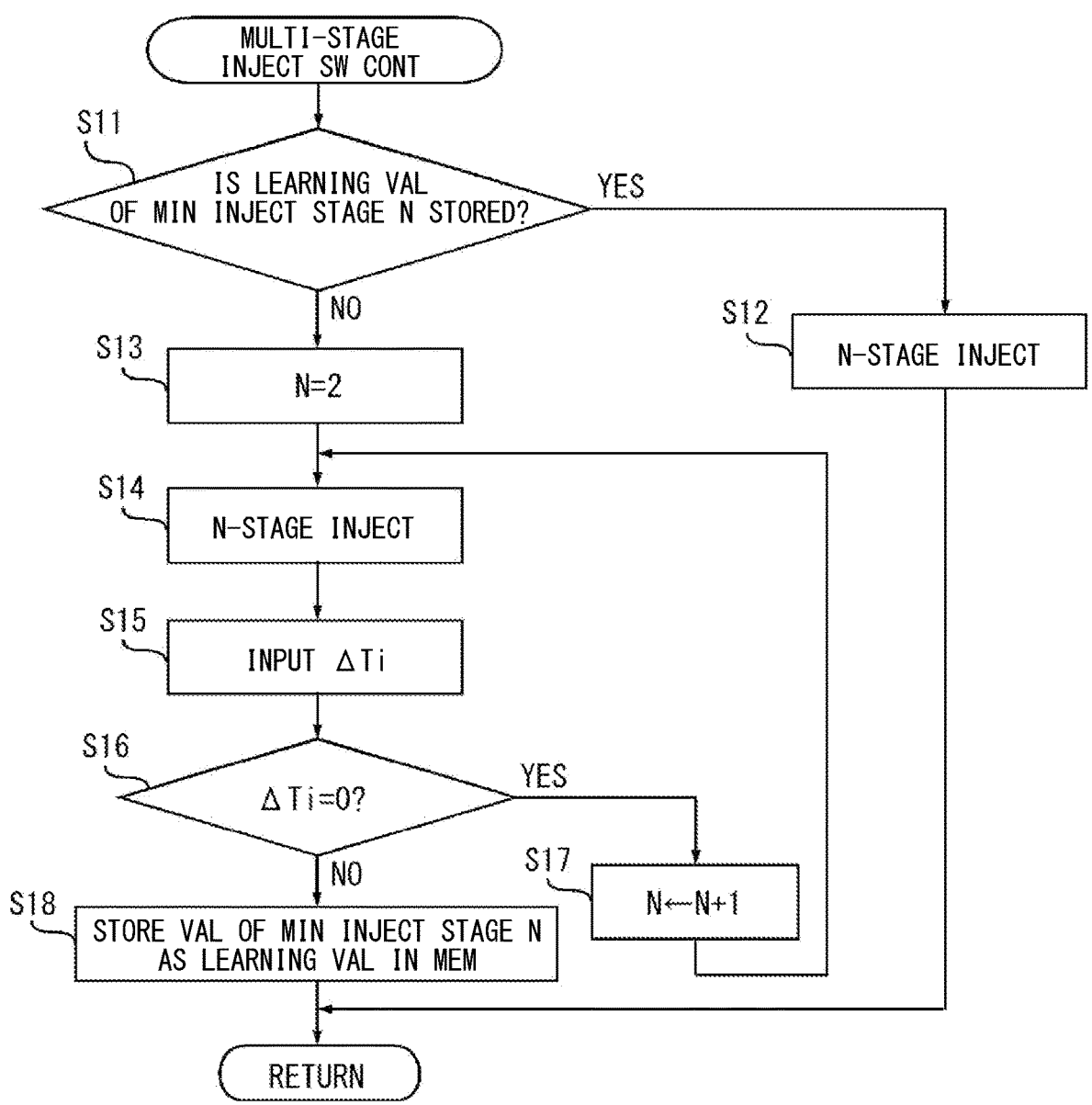
FIG. 8 is a second flowchart schematically illustrating the flow of the multi-stage injection switching control.
Figure 9:
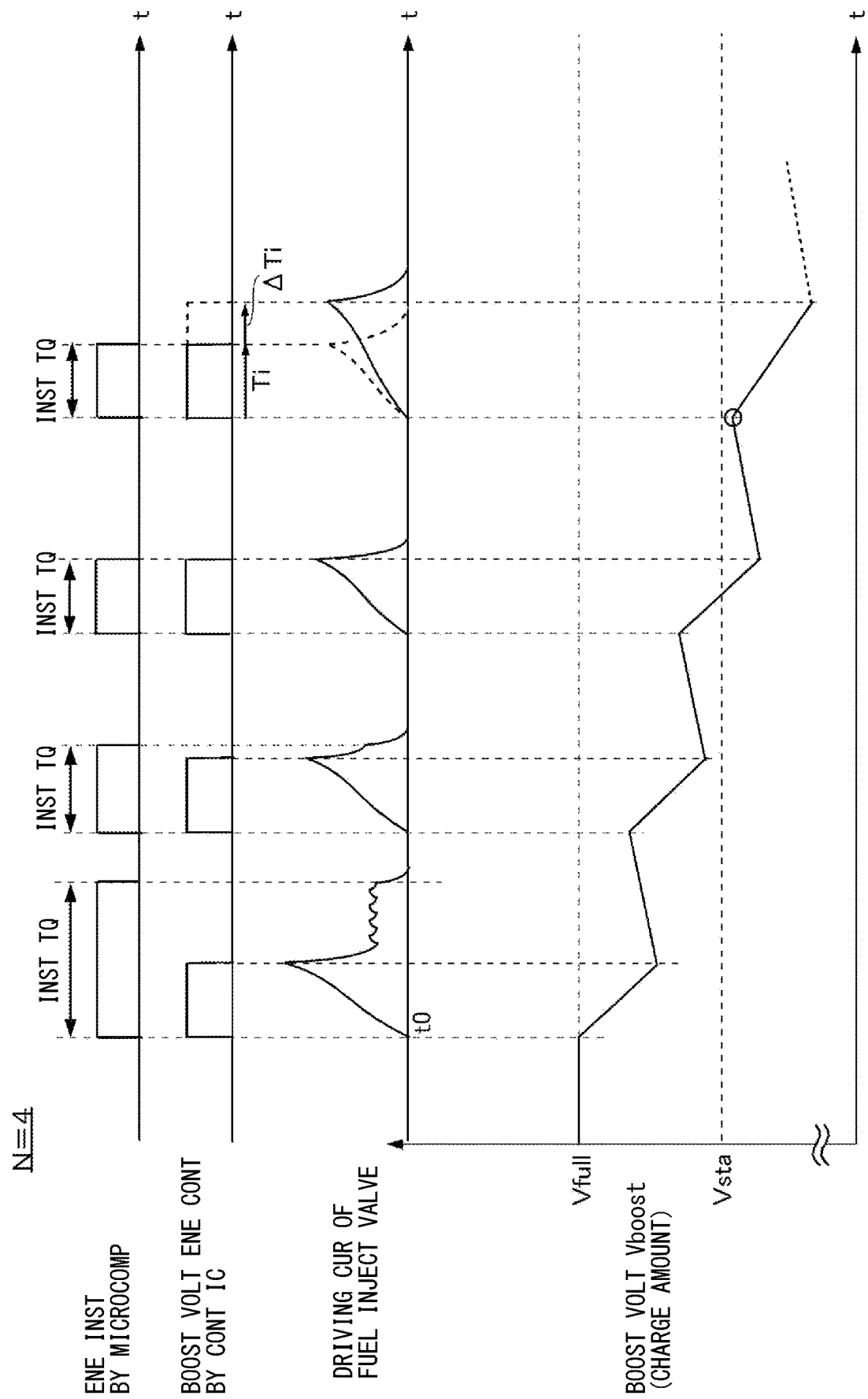
FIG. 9 is a first timing chart schematically illustrating variations in the driving current waveform and the boost voltage of the fuel injection valve at multi-stage injection.

As illustrated in FIG. 8, in the multi-stage injection switching control, the microcomputer 4 determines whether a learning value of a minimum injection stage N is stored in the memory 4b in S11. The minimum injection stage N described herein indicates the number of injections during multi-stage injection control and serves as a standard for the control IC 5 performing the area correction control with high probability. The minimum injection stage N referred to here is an integer that satisfies N≥2 and indicates the number of injections during multi-stage injection control, which is a guideline for the control IC 5 to perform area correction control with high probability. As illustrated in FIG. 9, the fuel injection valve 2 continuously consumes the stored power of the boost voltage Vboost by continuously injecting fuel during the multi-stage injection control. Thus, it is possible to increase the possibility that the boost voltage Vboost becomes lower than the predetermined voltage Vsta and thus increase the possibility that the control IC 5 performs the area correction control.

When the learning value of the minimum injection stage N is stored in the memory 4b, the microcomputer 4 determines YES in S11 and makes a switch to N-stage injection in S12. As illustrated in an example of FIG. 9 in which the learning value is N=4, the boost voltage Vboost becomes lower than the predetermined voltage Vsta by performing injection at least N times corresponding to the minimum injection stage N during the multi-stage injection control. In this case, the control IC 5 performs the area correction control.

On the other hand, when the learning value of the minimum injection stage N is not stored in the memory 4b, the microcomputer 4 determines NO in S11, sets N to an initial value "2" in S13, performs N-stage injection in S14, receives the energization time correction amount ΔTi input thereto from the control IC 5 in S15, and determines whether the input energization time correction amount ΔTi is zero in S16. The energization time correction amount ΔTi of any value other than zero indicates that the area correction control is performed in the control IC 5, whereas the energization time correction amount ΔTi of zero indicates that the area correction control is not performed in the control IC 5.

When it is determined in S16 that the energization time correction amount ΔTi is zero, the microcomputer 4 increments N by 1 in S17 and repeatedly performs the processes of S14 to S16 until the control IC 5 performs the area correction control, the input energization time correction amount ΔTi becomes any value other than zero, and NO is thus determined in S16.

When the determination result is NO in S16, the microcomputer 4 causes the number-of-stages learning unit 14 to store, as the learning value, the minimum injection stage N in the memory 4b. As illustrated in the example of FIG. 9 in which the learning value is N=4, the boost voltage Vboost becomes lower than the predetermined voltage Vsta by performing injection at least N=4 times during the multi-stage injection control. Thus, the control IC 5 performs the area correction control.

Figure 10:
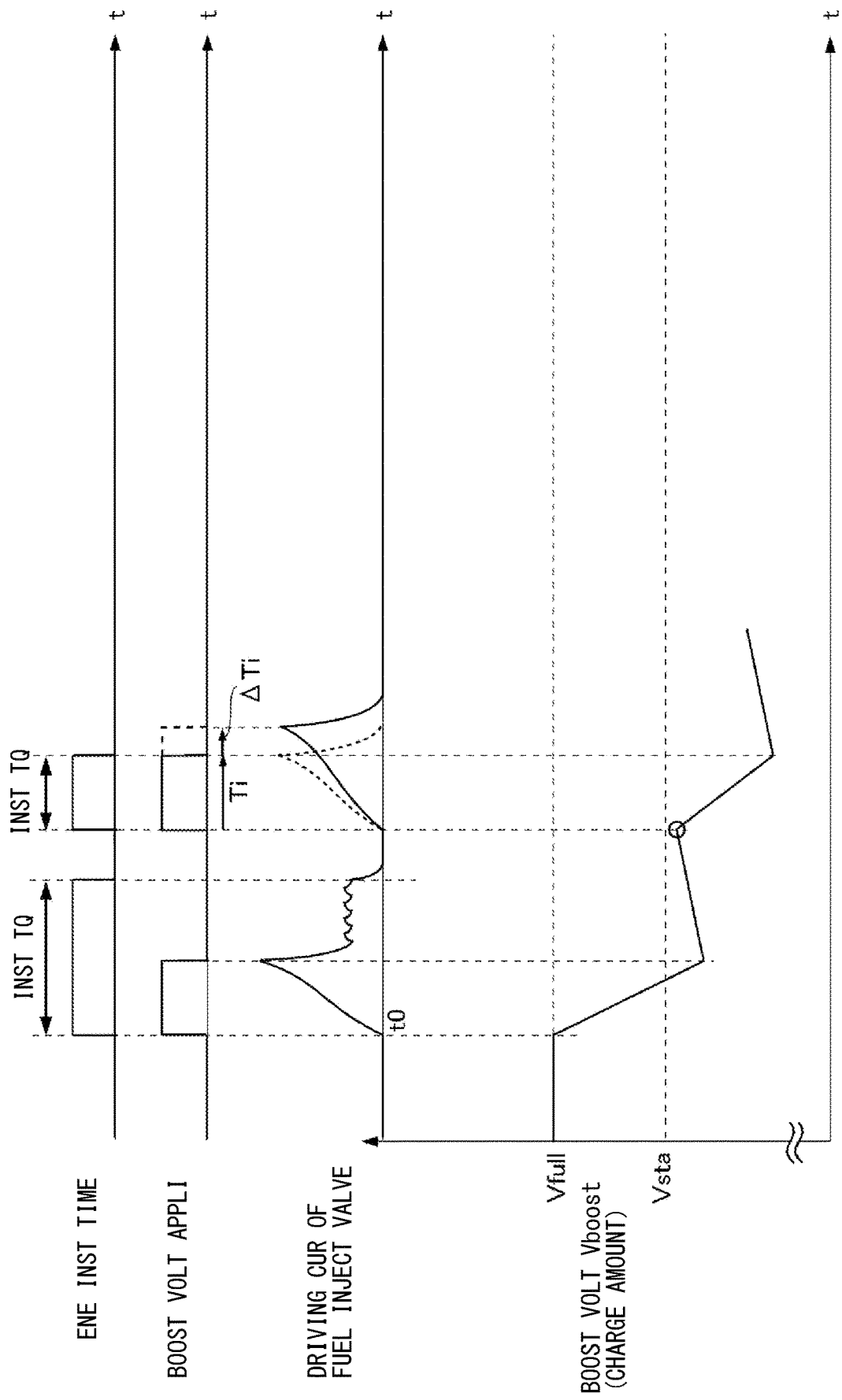
FIG. 10 is a second timing chart schematically illustrating variations in the driving current waveform and the boost voltage of the fuel injection valve at multi-stage injection.

FIG. 10 illustrates an example in which the learning value is N=2. In a case where the present invention is applied to an injection system in which the amount of reduction in the boost voltage Vboost at one injection is large, the boost voltage Vboost may be largely reduced by one injection. Thus, also in multi-stage injection control in which the number of stages is N=2, which is small, the control IC 5 performs the area correction control.

An optimum value for the minimum injection stage N varies in various manners due to the difference in performance and aged deterioration of the fuel injection valves 2, the difference in individual solid performance and aged deterioration in the entire injection system, and change over time in the amount of reduction in the boost voltage Vboost. Thus, the microcomputer 4 performing the process illustrated in FIGS. 7 and 8 enables flexible response to various injection systems. In addition, the learning value can be variously changed in response to various performances and changes over time. Consequently, it is possible to flexibly respond to various systems.

As described above, according to the present embodiment, the microcomputer 4 makes a switch from the single injection to the multi-stage injection using the multi-stage injection switch unit 12 when the single injection is consecutively performed under the predetermined condition. As a result, the charge amount of the charging capacitor 3a of the booster circuit 3 can be set to less than the predetermined voltage Vsta, and the control IC 5 can perform area correction by the energization time correction amount calculation unit 5d. When the switch to the multi-stage injection is made, it is possible to increase the possibility that the area correction is executed and increase the number of checks per unit time. Consequently, a high monitor rate can be ensured.

In the present embodiment, injection that should be normally the single injection is forcibly switched to the multi-stage injection. The microcomputer 4 can minimize the injection quantity difference from the single injection by setting the number of stages of the multi-stage injection to the minimum injection stage N. Moreover, the processing load of the electronic control unit 1 can be reduced by the reduction to the minimum injection stage N.

Second Embodiment

Figure 11:
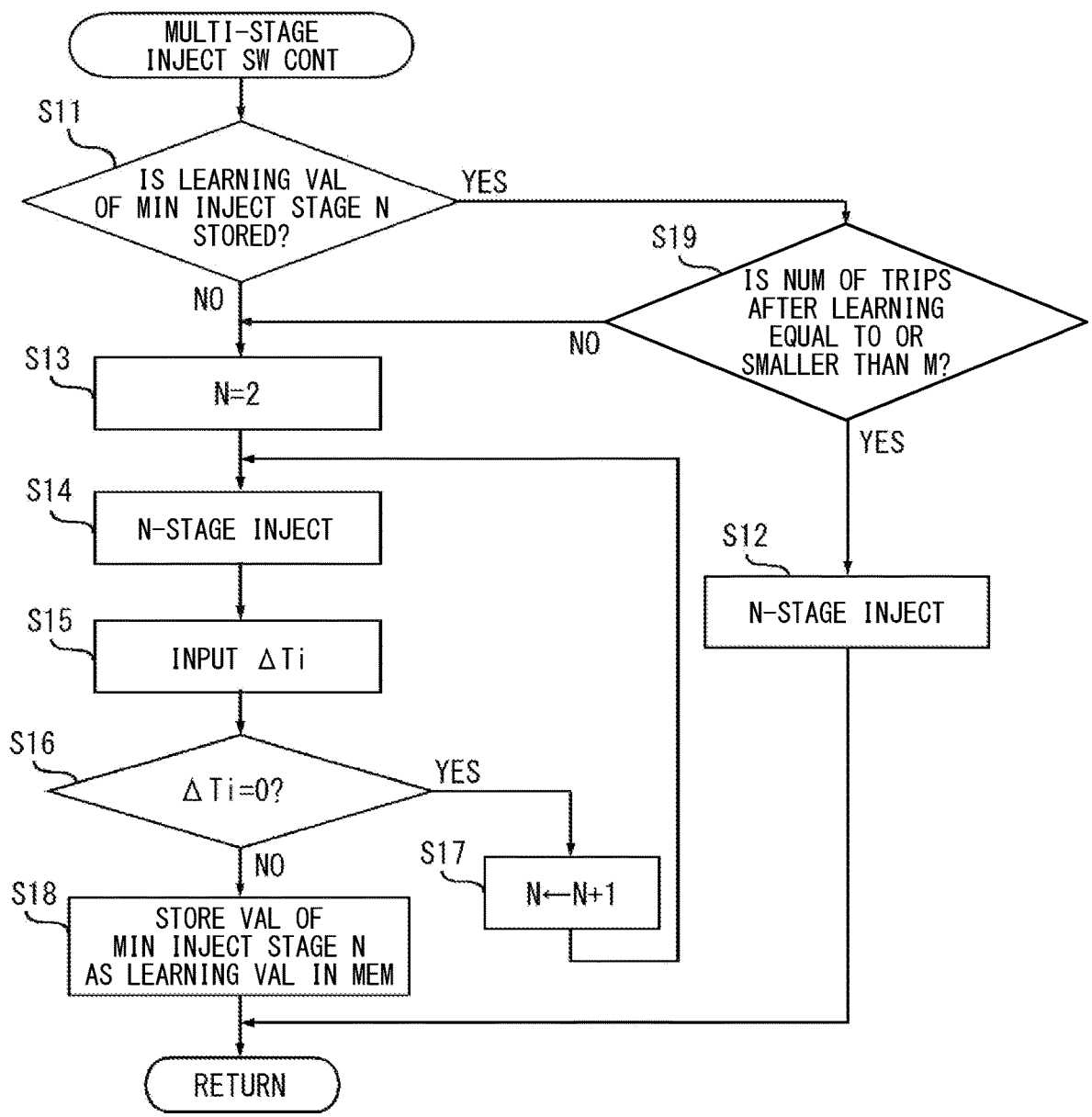
FIG. 11 is a flowchart schematically illustrating the flow of multi-stage injection switching control in a second embodiment.

FIG. 11 is an explanatory diagram of a second embodiment. The same parts as those of the above embodiment are designated by the same reference signs as those used in the above embodiment to omit description thereof.

As illustrated in FIG. 11, when it is determined, in S11 during the multi-stage injection switching control, that the learning value of the minimum injection stage N is stored in the memory 4b, the microcomputer 4 determines whether the number of trips after learning is equal to or smaller than a predetermined number M in S19. That is, the microcomputer 4 determines whether the learning value of the minimum injection stage N is a recent learning value and meets a predetermined criterion. When the number of trips after learning is equal to or smaller than the predetermined number M, it is determined that the learning value is the recent learning value and meets the predetermined criterion, and N-stage injection is performed in S12.

On the other hand, when it is determined that the number of trips after learning is larger than the predetermined number M, the microcomputer 4 determines that the learning value is old and does not meet the predetermined criterion. In this case, the microcomputer 4 shifts to S13 and learns the minimum injection stage N as indicated in S13 to S18. Consequently, it is possible to regularly update the learning value of the minimum injection stage N.

Third Embodiment

Figure 12:
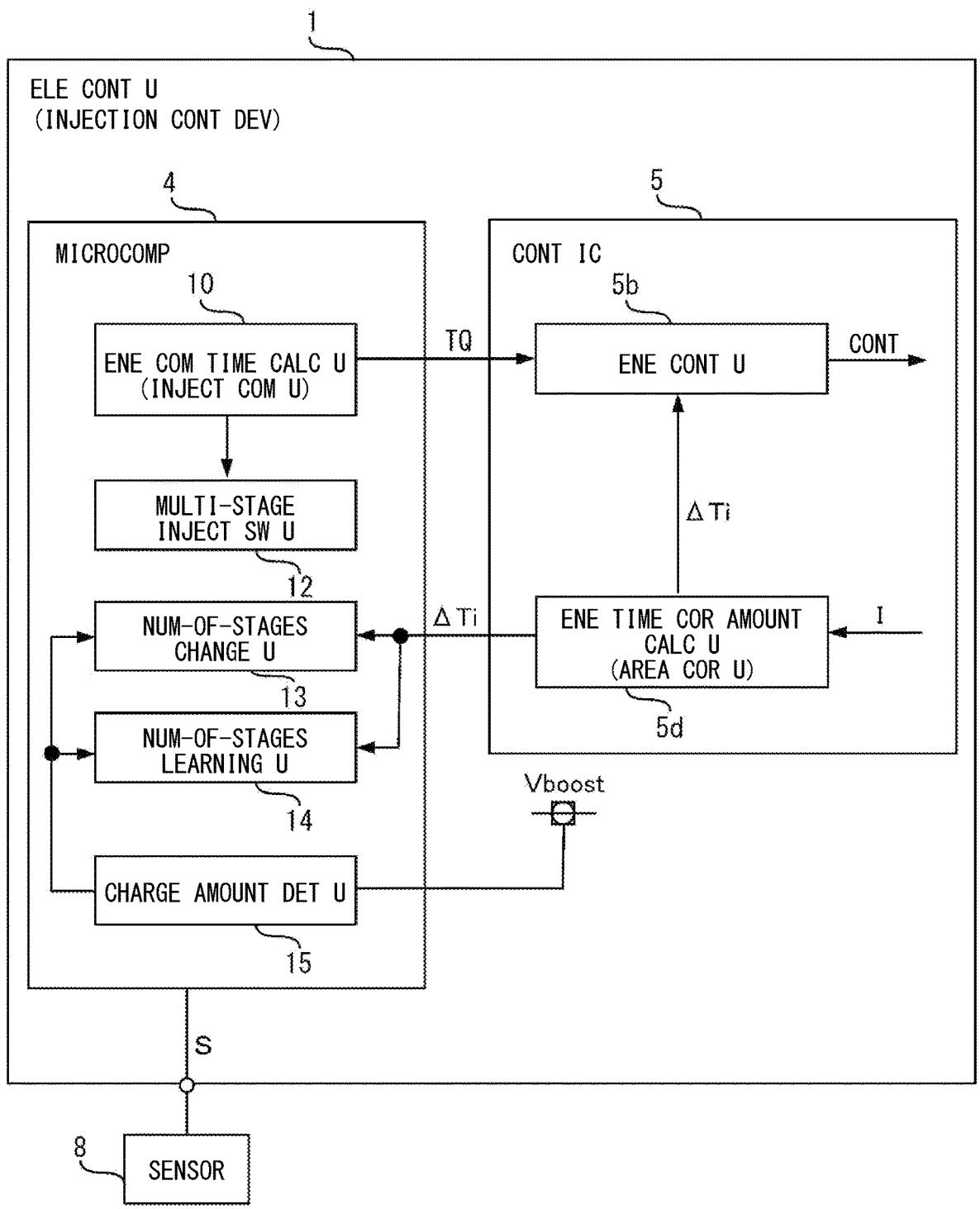
FIG. 12 is a functional configuration diagram of a microcomputer and a control IC in a third embodiment.
Figure 13:
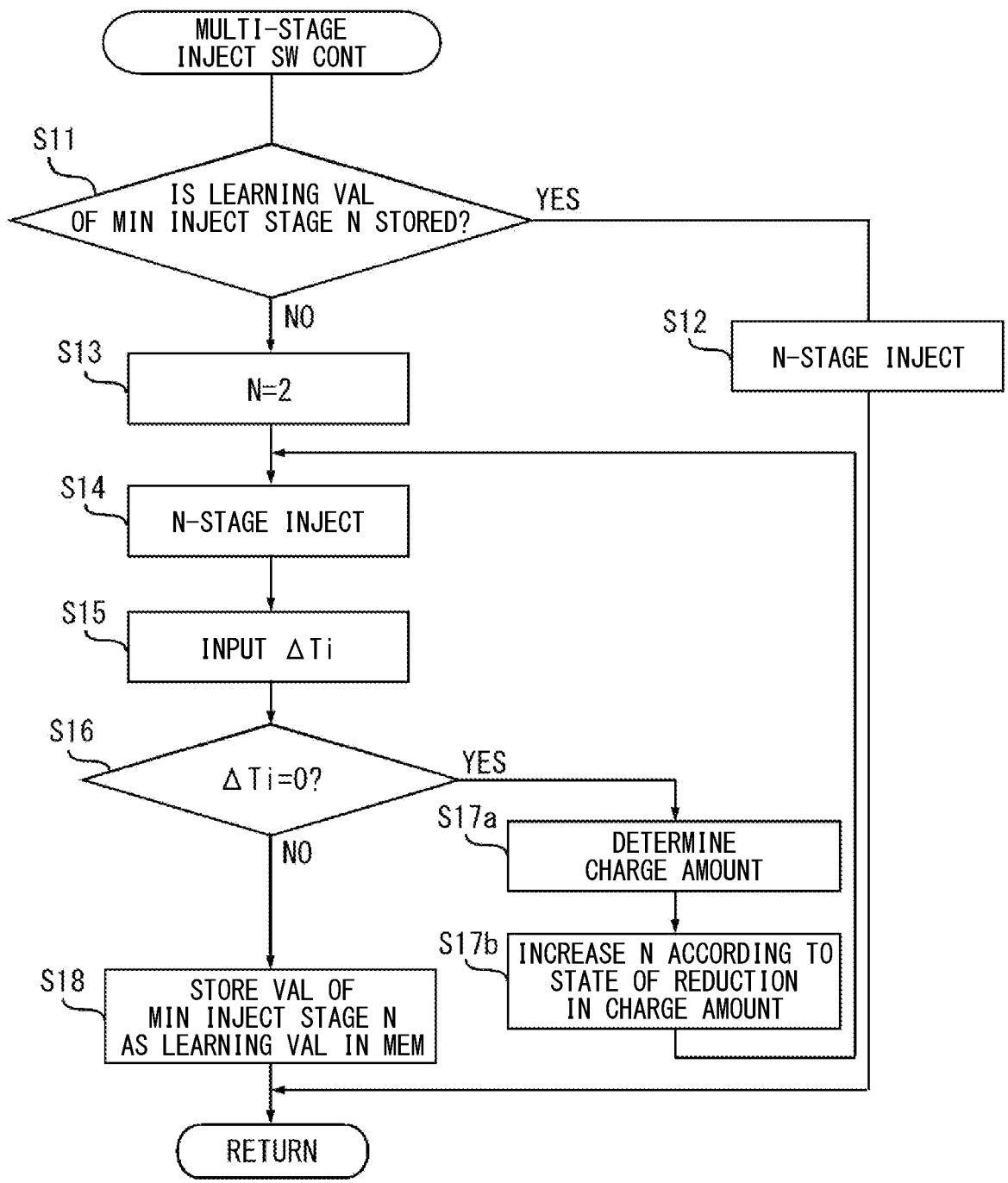
FIG. 13 is a flowchart schematically illustrating the flow of multi-stage injection switching control in a third embodiment.

FIGS. 12 and 13 are explanatory diagrams of a third embodiment. The same parts as those of the above embodiment are designated by the same reference signs as those used in the above embodiment to omit description thereof.

As illustrated in FIG. 12, the microcomputer 4 has a function of a charge amount determination unit 15. The charge amount determination unit 15 of the microcomputer 4 directly acquires the boost voltage Vboost of the charging capacitor 3a of the booster circuit 3 from the control IC 5 to determine the charge amount. At this time, the charge amount determination unit 15 of the microcomputer 4 may directly acquire the boost voltage Vboost, for example, through a step-down circuit or may acquire information of the boost voltage Vboost from the control IC 5. The charge amount determination unit 15 may estimate the charge amount of the charging capacitor 3a of the booster circuit 3. The charge amount determination unit 11 of the microcomputer 4 preferably estimates the charge amount of the booster circuit 3 on the basis of the information of the injection quantity described above or information of the battery voltage VB or the like.

The number-of-stages change unit 13 of the present embodiment has a function of increasing the number of stages of the multi-stage injection according to the state of reduction in the charge amount of the charging capacitor 3a so that the energization time correction amount calculation unit 5d calculates the energization time correction amount ΔTi, that is, performs the area correction.

The number-of-stages learning unit 14 of the present embodiment has a function of learning the number of stages of the multi-stage injection while increasing the number of stages of the multi-stage injection according to the state of reduction in the charge amount of the charging capacitor 3a so that the energization time correction amount calculation unit 5d calculates the energization time correction amount ΔTi, that is, performs the area correction.

As illustrated in FIG. 13, in the multi-stage injection switching control, when the learning value of the minimum injection stage N is stored in the memory 4b, the microcomputer 4 determines YES in S11 and make a switch to N-stage injection in S12.

On the other hand, when the learning value of the minimum injection stage N is not stored in the memory 4b, the microcomputer 4 determines NO in S11, sets N to an initial value "2" in S13, performs N-stage injection in S14, and receives the energization time correction amount ΔTi input thereto in S15.

In S16, the microcomputer 4 determines whether the input energization time correction amount ΔTi is zero. The energization time correction amount ΔTi of any value other than zero indicates that the area correction control is performed in the control IC 5, whereas the energization time correction amount ΔTi of zero indicates that the area correction control is not performed in the control IC 5.

Thus, when the energization time correction amount ΔTi is zero, the microcomputer 4 determines YES in S16 and shifts the process to S17a. In S17a, the microcomputer 4 receives the boost voltage Vboost input thereto from the booster circuit 3 to determine the charge amount. The microcomputer 4 can detect the difference between the charge amount and the predetermined voltage Vsta by determining the charge amount in S17a.

Next, in S17b, the microcomputer 4 increases the minimum injection stage N according to the state of reduction in the charge amount. Specifically, since the microcomputer 4 detects the difference between the charge amount and the predetermined voltage Vsta by determining the charge amount in S17a, the microcomputer 4 largely increases the minimum injection stage N when the difference is large and slightly increases the minimum injection stage N when the difference is small. This eliminates the necessity of incrementing the minimum injection stage N by 1.

The microcomputer 4 repeatedly performs the processes of S14 to S16 until the control IC 5 performs the area correction control, the input energization time correction amount ΔTi becomes any value other than zero, and NO is thus determined in S16. When the determination result is NO in S16, the microcomputer 4 causes the number-of-stages learning unit 14 to store, as the learning value, the minimum injection stage N in the memory 4b.

As described above, the present embodiment also achieves effects similar to those of the above embodiments. In addition, it is not necessary to increment the minimum injection stage N by 1 and improve the learning effect.

Fourth Embodiment

Figure 14:
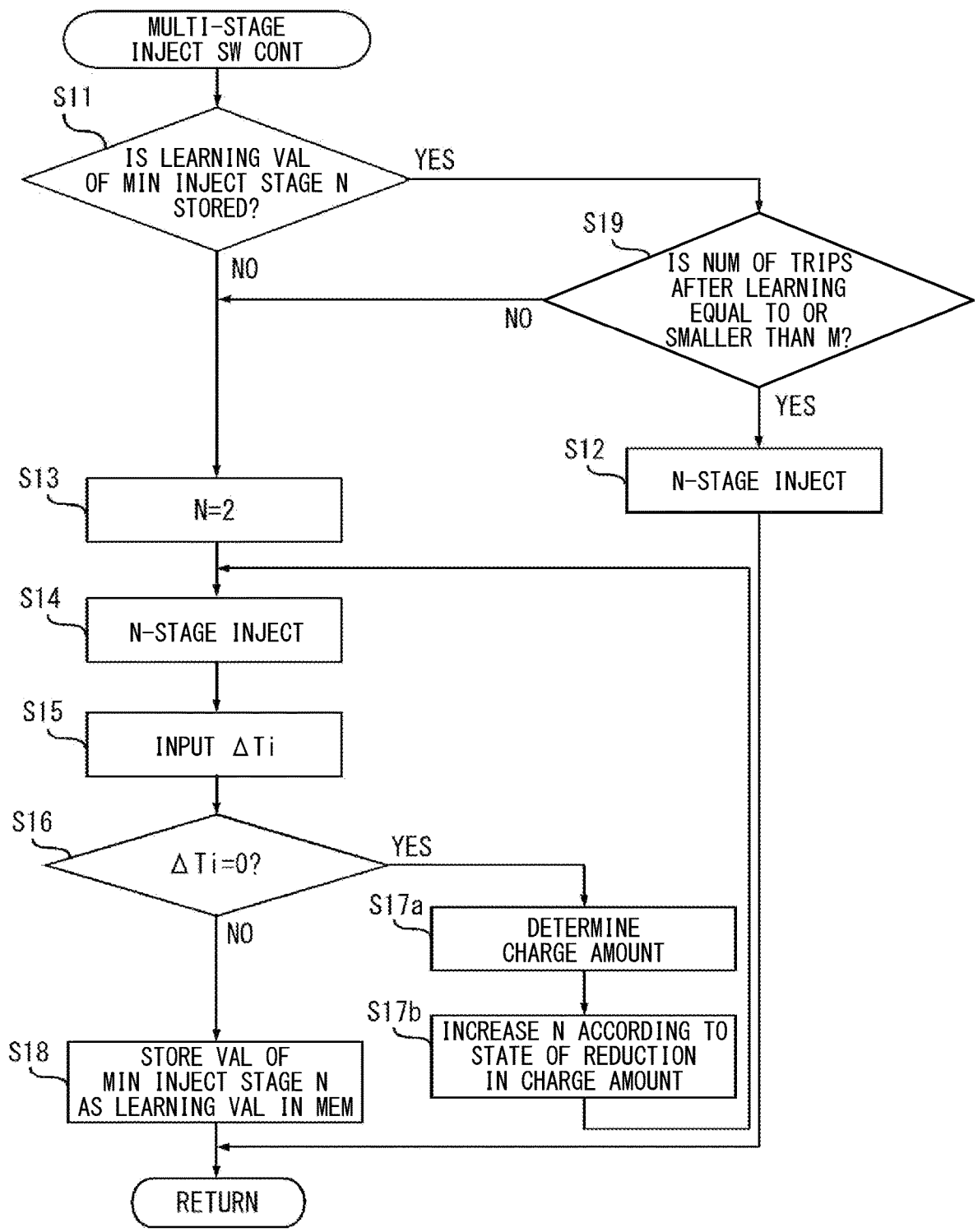
FIG. 14 is a flowchart schematically illustrating the flow of multi-stage injection switching control in a fourth embodiment.

FIG. 14 is an explanatory diagram of a fourth embodiment. The same parts as those of the above embodiment are designated by the same reference signs as those used in the above embodiment to omit description thereof.

As illustrated in FIG. 14, when it is determined, in S11 during the multi-stage injection switching control, that the learning value of the minimum injection stage N is stored in the memory 4b, the microcomputer 4 determines whether the number of trips after learning is equal to or smaller than the predetermined number M in S19. That is, the microcomputer 4 determines whether the learning value of the minimum injection stage N is a recent learning value and meets a predetermined criterion. When the number of trips after learning is equal to or smaller than the predetermined number M, it is determined that the learning value is the recent learning value and meets the predetermined criterion, and N-stage injection is performed in S12.

On the other hand, when it is determined that the number of trips after learning is larger than the predetermined number M, the microcomputer 4 determines that the learning value is old and does not meet the predetermined criterion. In this case, the microcomputer 4 shifts to S13 and learns the minimum injection stage N as indicated in S13 to S18. Consequently, it is possible to regularly update the learning value of the minimum injection stage N and achieves effects similar to those of the second embodiment.

Other Embodiments

The present disclosure should not be limited to the embodiments described above, and various modifications may further be implemented without departing from the gist of the present disclosure. For example, the following modifications or extensions are possible. The embodiments described above may be combined as necessary.

Although the mode in which the microcomputer 4 and the control IC 5 are configured as separate integrated circuits has been described, the microcomputer 4 and the control IC 5 may be integrated with each other. In this case, it is preferable to use a high-speed processor. In the above embodiments, the present invention is applied to direct injection that directly injects fuel into a combustion chamber of the internal combustion engine. However, the present invention is not limited thereto and may be applied to port injection that injects fuel in front of a known intake valve.

Although the above embodiments describe the mode in which the control IC 5 simply calculates the integrated current difference ΣΔI by calculating the area of the trapezoid of the energization current EI of the fuel injection valve 2, the present invention is not limited thereto. The energization current EI of the fuel injection valve 2 nonlinearly varies both before and after reaching the peak current $I_{pk}$. Thus, it is preferable to simply calculate the integrated current difference by approximately calculating the integrated current using a polygon such as a triangle, a rectangle, or a trapezoid. This makes it possible to dramatically reduce the operation amount.

The means and/or the functions provided by the microcomputer 4 and the control IC 5 can be provided by software recorded in a substantive memory device and a computer executing the software, software only, hardware only, or a combination thereof. For example, when the control device is provided by an electronic circuit as hardware, the control device can include a digital circuit including one or more logic circuits or an analog circuit. Further, for example, when the control device executes various control operations using software, a program is stored in the storage unit, and the control main body executes the program to implement a method corresponding to the program.

The control units and methods described in the present disclosure may be implemented by a special purpose computer provided by configuring a memory and a processor programmed to execute one or more functions embodied by a computer program. Alternatively, the control units and methods described in the present disclosure may be implemented by a special purpose computer provided by configuring a processor with one or more dedicated hardware logic circuits. Alternatively, the control units and methods described in the present disclosure may be implemented by one or more special purpose computers configured by combining a memory and a processor programmed to execute one or more functions with one or more dedicated hardware logic circuits. The computer program may also be stored in a computer readable non-transitory tangible storage medium as instructions to be executed by a computer.

Two or more embodiments described above may be combined to implement the control of the present disclosure. In addition, the reference numerals in parentheses described in the claims simply indicate correspondence to the concrete means described in the embodiments, which is an example of the present disclosure. That is, the technical scope of the present invention is not necessarily limited thereto. A part of the above-described embodiment may be dispensed/dropped as long as the problem identified in the background is resolvable. In addition, various modifications from the present disclosure in the claims are considered also as an embodiment thereof as long as such modification pertains to the gist of the present disclosure.

Although the present disclosure is described based on the above embodiments, the present disclosure is not limited to the disclosure of the embodiment and the structure. The present disclosure is intended to cover various modification examples and equivalents thereof. In addition, various modes/combinations, one or more elements added/subtracted thereto/therefrom, may also be considered as the present disclosure and understood as the technical thought thereof.

In the drawing, 1 indicates an electronic control unit (injection control device), 2 indicates a fuel injection valve, 5*d* indicates an energization time correction amount calculation unit (area correction unit), 10 indicates an energization time calculation unit (injection command unit), 12 indicates a multi-stage injection switch unit, 13 indicates a number-of-stages change unit, 14 indicates number-of-stages learning unit, and 15 indicates a charge amount determination unit.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An injection control device comprising:
   an injection command unit that executes a current-drive of a fuel injection valve to inject fuel through a single injection or a multi-stage injection;
   an area correction unit that calculates an energization time correction amount by performing area correction on a current flowing through the fuel injection valve when the injection command unit controls the fuel injection valve to inject the fuel through the single injection or the multi-stage injection; and
   a multi-stage injection switch unit that switches from the single injection to the multi-stage injection when the single injection is consecutively performed under a predetermined condition.

2. The injection control device according to claim 1, wherein:
   the multi-stage injection switch unit switches from the single injection to the multi-stage injection under a condition that the single injection is consecutively performed for a predetermined time.

3. The injection control device according to claim 1, wherein:
   the multi-stage injection switch unit switches from the single injection to the multi-stage injection under a condition that the single injection is consecutively performed a predetermined number of times.

4. The injection control device according to claim 1, further comprising:
   a number-of-stages change unit that increases a number of stages of the multi-stage injection to perform the area correction by the area correction unit after the multi-stage injection switch unit switches from the single injection to the multi-stage injection.

5. The injection control device according to claim 1, further comprising:
   a number-of-stages learning unit that learns a number of stages of the multi-stage injection to perform the area correction by the area correction unit after the multi-stage injection switch unit switches from the single injection to the multi-stage injection.

6. The injection control device according to claim 1, further comprising:
   a charge amount determination unit that determines a charge amount of a charging unit that holds power to be supplied to the fuel injection valve; and
   a number-of-stages change unit that increases a number of stages of the multi-stage injection according to a reduction state of the charge amount of the charging unit to perform the area correction by the area correction unit after the multi-stage injection switch unit switches from the single injection to the multi-stage injection.

7. The injection control device according to claim 1, further comprising:
- a charge amount determination unit that determines a charge amount of a charging unit that holds power to be supplied to the fuel injection valve; and
- a number-of-stages learning unit that learns a number of stages of the multi-stage injection while increasing the number of stages of the multi-stage injection according to a reduction state of the charge amount of the charging unit to perform the area correction by the area correction unit after the multi-stage injection switch unit switches from the single injection to the multi-stage injection.

8. The injection control device according to claim 1, further comprising:
- one or more processors; and
- a memory coupled to the one or more processors and storing program instructions that when executed by the one or more processors cause the one or more processors to provide at least: the injection command unit; the area correction unit; and the multi-stage injection switch unit.

\* \* \* \* \*